C. & A. Jones,
Bee Hive.

No. 113,892. Patented Apr. 18, 1871.

Witnesses:
T. C. Brecht
Phil. T. Dodge

Inventors
Campbell Jones,
and
Albert Jones,
by
Dodge & Munn
att'ys

United States Patent Office.

CAMPBELL JONES AND ALBERT JONES, OF SANTA ANNA, ILLINOIS.

Letters Patent No. 113,892, dated April 18, 1871.

IMPROVEMENT IN BEE-HIVES.

The Schedule referred to in these Letters Patent and making part of the same.

*To all whom it may concern:*

Be it known that we, CAMPBELL JONES and ALBERT JONES, of Santa Anna, in the county of De Witt and State of Illinois, have invented certain Improvements in Bee-Hives, of which the following is a specification, reference being had to the accompanying drawing—

Our invention relates to a novel construction and arrangement of various parts of the hive, as hereinafter described.

In the drawing—

Figure 3:
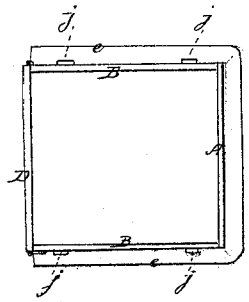
Figure 3 is a top plan view of the body of the hive.
Figure 2:
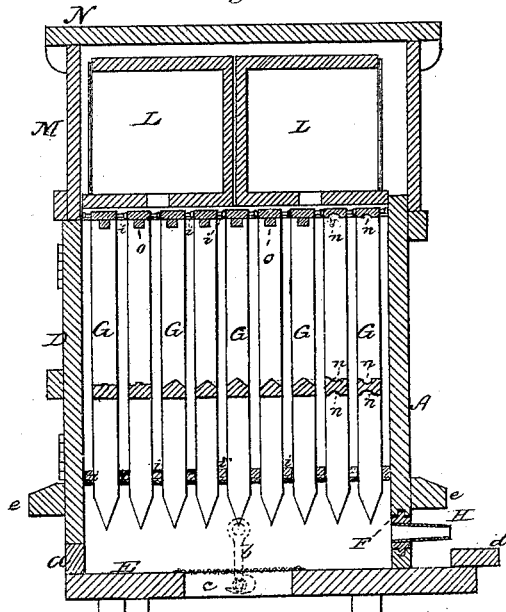
Figure 2 is a vertical section through the middle of the hive from front to rear.

In constructing our hive we first nail rigidly together the front A and the two sides B B of the body in the manner shown in fig. 3, and connect the lower rear corners of the two sides B by a narrow bar, *a*, nailed to them as shown in fig. 2.

To one of the sides B we hinge the back D of the body, as shown in figs. 2 and 3, so as to shut across from one side, B, to the other; and to one of the sides B we secure a hook for fastening the back or door shut.

To the lower end of the body thus formed we secure, by means of two hooks, *b b*, a bottom-board, E, which has through its middle a gauze-covered opening, *c*, for the purpose of ventilation.

When thus attached, it will be seen that the bottom can be readily detached for the purpose of cleansing it or of leaving the bottom of the hive open, as is sometimes necessary.

The forward end of the bottom E we extend out in front of the hive, and secure a strip or cleat, *d*, to its upper front edge, as shown in fig. 2, so as to form a lighting-board for the bees.

Figure 1:
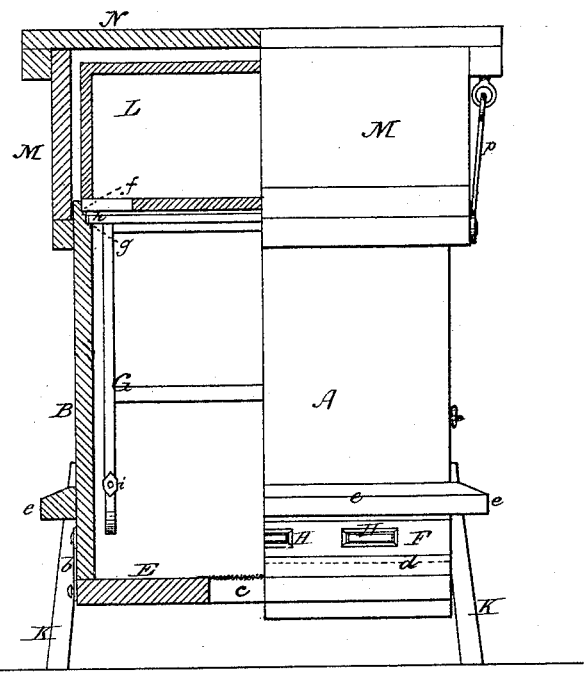
Figure 1 is a view from the front of our hive, with one-half thereof shown in elevation, and the other half taken in section through the middle.

Across the front A and the two sides B of the body, near the lower end thereof, we secure a thick strip or cleat, *e*, and through this cleat we make four mortises or holes *j*, to receive the upper ends of four legs, K, which are inserted therein as shown in fig. 1, one in each hole.

These legs support the hive off from the ground, out of the snow or mud, and allow the free passage of fresh air in through the ventilator *c*, and thus obviate the necessity of a stand or frame for the purpose of supporting the hive.

When for any purpose it is desired to set the hive down on its bottom the legs can be readily withdrawn.

Through the front A of the hive, near the bottom, we cut a transverse slot and mount therein a bar, F, having three slots or openings made through it, and an outwardly-projecting tube, H, mounted in each of the said openings, as shown in figs. 1 and 2. These tubes we make of a flat or rectangular form in cross-section, with their inner ends wider than the outer, and of such length and in such position that their outer ends are in line with, but a little above, the rear edge of the lighting-bar or board *d*, as shown in figs. 1 and 2.

When thus arranged the tubes afford an easy entrance for the bees from the bar *d*, while at the same time they are a great safeguard against the entrance of the bee-moth.

We have found by actual trial and experiment that, while the bees can, and do, readily enter the hive through the tubes, the miller, in the great majority of cases, fails to do so; for, even after getting onto the strip *d*, opposite the mouth of a tube, the miller will pass under, instead of into the tube.

The bar F, in which the entrance-tubes are mounted, is held in place by tongues and grooves, so that it may be removed, with the tubes, at will.

The inner upper edge of each side B we cut away, so as to form two horizontal ledges or shoulders *f* and *g* thereon, as shown in fig. 1.

Within the body we suspend a series of comb-frames, G, by means of arms *h* on their upper ends, which rest upon the lower shoulders *g* of the sides B, as shown in fig. 1.

The frames have pins or studs *i* on their sides, by which they are held at the proper distance apart, as shown in figs. 1 and 2.

Figure 4:
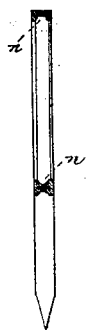
Figure 4 is a vertical section of one of the removable comb-frames.

The inner sides of the frames, or rather of the bars thereof, against which the edge of the comb is built, we groove or hollow out longitudinally, as shown at *n*, figs. 2 and 4, so as to guide the bees when starting the comb, and cause them to build it straight and flush with the frame.

Heretofore it has been customary to make the bars of the frames with an edge on the inner side, or to nail a narrow strip thereto, as shown at *o*, fig. 2, for the purpose of guiding the bees; but we have by experiment found that the concave or grooved bars are far superior to all others.

Across the top of the hive, above the frames, we place two honey-boxes, L, the ends of which rest upon and are supported by the ledges or shoulders *f* of the sides B, as shown in fig. 1.

These honey-boxes we make of the usual form, with glass in their outer and openings in their lower sides, as shown. By this method of supporting the boxes we dispense with the usual honey-board placed on the hive to sustain them.

We next provide a rectangular frame, M, of the proper height, and of such size as to fit snugly over and around the end of the body, and place it thereon around the honey-boxes, as shown in figs. 1 and 2, cleats $p$ being fastened to the sides of the body to support the frame and prevent it from sliding down over the body.

On the frame M we place a flat top or cover, N. To the cleats $p$ we pivot hooks $t$, and to the top N attach eyes, into which the hooks $p$ may be engaged so as to hold the top and the frame M in place.

In this manner we produce a very cheap, simple, and efficient hive, which is well and thoroughly ventilated, and all parts of which are accessible.

By opening the back of the body the frames are all exposed, so that they can be readily inspected or removed.

The cleat $e$, besides serving to hold the legs of the hive, also prevents the front and sides from warping, and shades the entrance-tubes in hot weather so that they will not become heated.

Having thus described our invention,

What we claim is—

1. A bee-hive having its body provided at its upper end with the two shoulders $f$ and $g$, the former for receiving and holding in place the honey-boxes, and the latter the comb-frames, as herein described.

2. The detachable piece F provided with the tubes H, with the raised lighting-board $d$ arranged in relation thereto, substantially as described.

CAMPBELL JONES.
ALBERT JONES.

Witnesses:
W. H. ANDERSON,
J. D. McMURRY.